(12) United States Patent
Maeda

(10) Patent No.: US 9,374,594 B2
(45) Date of Patent: Jun. 21, 2016

(54) CONVERTING APPARATUS

(71) Applicant: BROTHER KOGYO KABUSHIKI KAISHA, Nagoya, Aichi (JP)

(72) Inventor: Jyunji Maeda, Ichinomiya (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 14/731,718

(22) Filed: Jun. 5, 2015

(65) Prior Publication Data

US 2015/0365690 A1 Dec. 17, 2015

(30) Foreign Application Priority Data

Jun. 11, 2014 (JP) ................. 2014-120683

(51) Int. Cl.
| | |
|---|---|
| *G06K 9/36* | (2006.01) |
| *G06K 9/46* | (2006.01) |
| *H04N 19/44* | (2014.01) |
| *H04N 19/124* | (2014.01) |
| *H04N 19/423* | (2014.01) |
| *H04N 19/176* | (2014.01) |
| *H04N 1/64* | (2006.01) |
| *H04N 19/60* | (2014.01) |
| *H04N 19/436* | (2014.01) |

(52) U.S. Cl.
CPC ............. *H04N 19/44* (2014.11); *H04N 1/648* (2013.01); *H04N 19/124* (2014.11); *H04N 19/176* (2014.11); *H04N 19/423* (2014.11); *H04N 19/436* (2014.11); *H04N 19/60* (2014.11); *H04N 2201/0094* (2013.01)

(58) Field of Classification Search
CPC . H04N 19/124; H04N 19/176; H04N 19/423; H04N 19/436; H04N 19/44; H04N 19/60; H04N 1/648; H04N 2201/0094
See application file for complete search history.

(56) References Cited

U.S. PATENT DOCUMENTS

| | | | |
|---|---|---|---|
| 5,349,348 A | 9/1994 | Anderson et al. | |
| 5,539,865 A | 7/1996 | Gentile | |
| 5,638,498 A | 6/1997 | Tyler et al. | |
| 5,764,801 A * | 6/1998 | Munemasa | H04N 19/436 375/E7.103 |

(Continued)

FOREIGN PATENT DOCUMENTS

| | | |
|---|---|---|
| JP | H05-191652 A | 7/1993 |
| JP | H05-211616 A | 8/1993 |

(Continued)

*Primary Examiner* — Phuoc Tran
(74) *Attorney, Agent, or Firm* — Scully, Scott, Murphy & Presser, PC

(57) ABSTRACT

A converting apparatus includes a plurality of decoders, and a plurality of pieces of decoded data respectively corresponding to a plurality of pieces of compressed image data are generated. A switcher is configured to output the plurality of pieces of decoded data, by every predetermined amount, in association with an identification code of a corresponding portion of the plurality of pieces of compressed image data as process target data, and switch a destination decoder among the plurality of pieces of decoders every time when the predetermined amount of process target data is output. A converter is configured to apply an inverse quantization process and an inverse frequency conversion process to the predetermined amount of process target data. Each of the pieces of sub-image data converted by the converter is stored in the storage area corresponding to the identification code associated with the each of the pieces of sub-image data.

10 Claims, 10 Drawing Sheets

(56) References Cited

U.S. PATENT DOCUMENTS

| | | | |
|---|---|---|---|
| 5,991,515 A | 11/1999 | Fall et al. | |
| 6,219,156 B1 | 4/2001 | Yoshida et al. | |
| 6,373,412 B1 | 4/2002 | Mitchell et al. | |
| 6,389,170 B1 | 5/2002 | Kawasaki et al. | |
| 2012/0224788 A1* | 9/2012 | Jia | H04N 5/235 382/274 |

FOREIGN PATENT DOCUMENTS

| | | |
|---|---|---|
| JP | H05-244423 A | 9/1993 |
| JP | H05-244426 A | 9/1993 |
| JP | H06-284297 A | 10/1994 |
| JP | H07-030763 A | 1/1995 |
| JP | H09-153991 A | 6/1997 |
| JP | H10-056545 A | 2/1998 |
| JP | H11-98367 A | 4/1999 |
| JP | H11-261424 A | 9/1999 |
| JP | 2000-050263 A | 2/2000 |
| JP | 2001-246793 A | 9/2001 |
| JP | 2002-271208 A | 9/2002 |
| JP | 2003-309848 A | 10/2003 |
| JP | 2004-228964 A | 8/2004 |
| JP | 2007-150569 A | 6/2007 |
| JP | 2007-288443 A | 11/2007 |
| JP | 2010-200174 A | 9/2010 |
| JP | 2013-197984 A | 9/2013 |

* cited by examiner

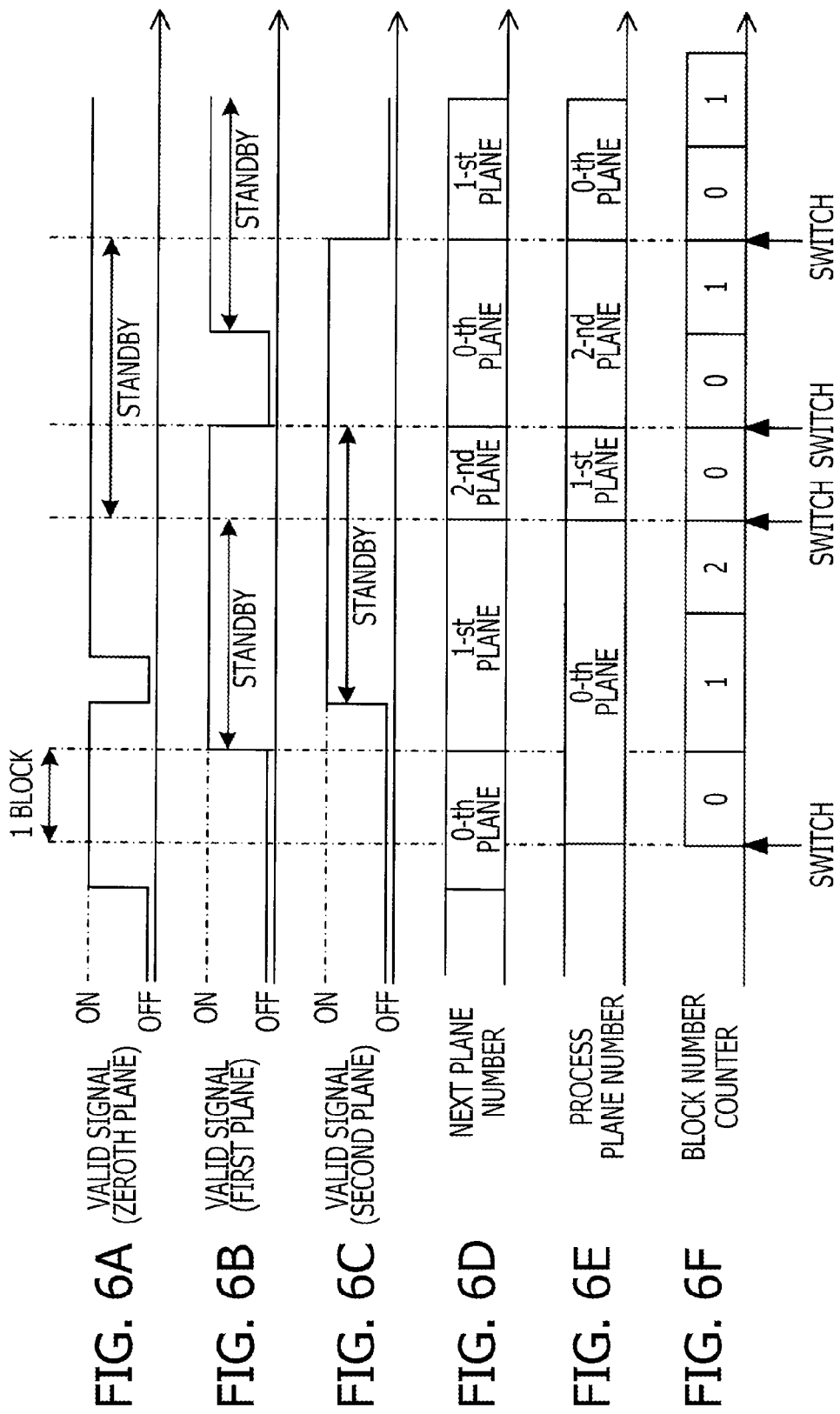

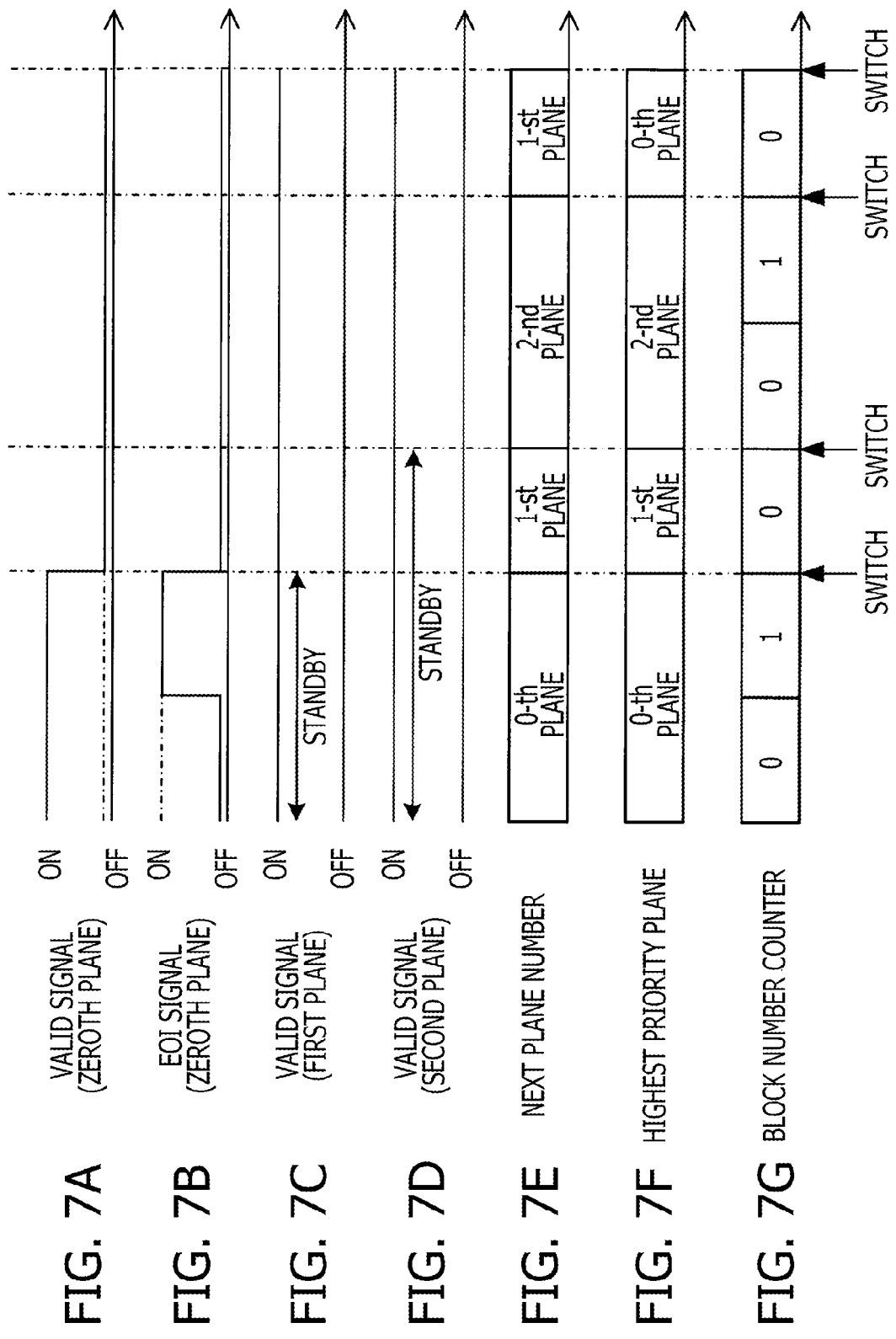

WAITING DATA ON FIRST PLANE

| (0-th PLANE) | (1-st PLANE) | (2-nd PLANE) |
|---|---|---|
| 10 | 9 | 9 |

↓ SELECT FIRST PLANE

| 10 | 10 | 9 |
|---|---|---|

↓ SELECT SECOND PLANE

| 10 | 10 | 10 |
|---|---|---|

↓ SELECT ZEROTH PLANE

| 11 | 10 | 10 |
|---|---|---|

FIG. 9A

NO WAITING DATA ON FIRST PLANE

| (0-th PLANE) | (1-st PLANE) | (2-nd PLANE) |
|---|---|---|
| 10 | 9 | 9 |

↓ SELECT SECOND PLANE

| 10 | 9 | 10 |
|---|---|---|

↓ SELECT ZEROTH PLANE

| 11 | 9 | 10 |
|---|---|---|

WAITING DATA ON FIRST PLANE ↓ SELECT FIRST PLANE

| 11 | 10 | 10 |
|---|---|---|

↓ SELECT FIRST PLANE

| 11 | 11 | 10 |
|---|---|---|

↓ SELECT FIRST PLANE

| 11 | 11 | 11 |
|---|---|---|

FIG. 9B

CONVERTING APPARATUS

This application claims priority under 35 U.S.C. §119 from Japanese Patent Application No. 2014-120683 filed on Jun. 11, 2014. The entire subject matter of the application is incorporated herein by reference.

BACKGROUND

1. Technical Field

The present disclosures relate to a converting apparatus.

2. Related Art

As one of compression methods of compressing digital image data, a JPEG (joint photographic experts group) compression method is known. An example of JPEG compression devices, a device having an image processing circuit, a part of which is used as a common circuit configured to process a plurality of pieces of image data, to convert uncompressed image data into compressed image data has been conventionally known.

SUMMARY

It is sometimes effective to convert a plurality of pieces of uncompressed image data into the compressed image data in parallel. Similarly, it is sometimes effective to convert a plurality of pieces of compressed image data into uncompressed image data in parallel. In the latter case, it is preferable that the compressed image data is converted into the uncompressed image data efficiently with suppressing a dimension of an image processing circuit. Additionally, it is preferable that each of the plurality of pieces of compressed image data is converted into the plurality of pieces of uncompressed data at appropriate processing speeds, respectively.

In consideration of the above, aspects of the present disclosures provide an improved converting apparatus capable of converting a plurality of pieces of compressed image data into a plurality of uncompressed image data in parallel.

According to aspects of the disclosures, there is provided a converting apparatus which is configured to convert a plurality of pieces of encoded compressed image data to a plurality of pieces of uncompressed image data, respectively, by decoding each of the plurality of pieces of encoded compressed image data. Such a converting apparatus includes a plurality of decoders each of which is configured to apply Huffman decoding to one of the plurality of pieces of compressed image data so that a plurality of pieces of decoded data respectively corresponding to the plurality of pieces of compressed image data are generated, a switcher configured to output the plurality of pieces of decoded data, by every predetermined amount, in association with an identification code of a corresponding portion of the plurality of pieces of compressed image data as process target data, the switcher being further configured to switch a destination decoder among the plurality of pieces of decoders every time when the predetermined amount of process target data is output, a converter configured to convert the predetermined amount of process target data to sub-image data constituting the uncompressed image data corresponding to the compressed image data by applying an inverse quantization process and an inverse frequency conversion process to the predetermined amount of process target data, a storage having a plurality of storage areas respectively corresponding to the plurality of pieces of compressed image data, and a controller. The controller includes a writing controller configured to store, per each piece of the compressed image data, the uncompressed image data composed of a group of pieces of sub-image data corresponding to the each of the compressed image data in the storage by writing each of the pieces of sub-image data converted by the converter in the storage area corresponding to the identification code associated with the each of the pieces of sub-image data.

According to the converting apparatus configured as above, decoded data corresponding to a plurality of pieces of compressed image data is processed per every predetermined amount of data with use of a common converter. Accordingly, as a converting apparatus capable of converting a plurality of pieces of compressed image data into a plurality of uncompressed image data with suppressing the dimension of the converting circuit.

BRIEF DESCRIPTION OF THE ACCOMPANYING DRAWINGS

FIGS. 6A-6F show a time chart showing operations of respective portions of the switching unit according to the illustrative embodiment of the disclosures.

FIGS. 7A-7G show a time chart showing operation of respective portions when EOI (end of image) signal is turned ON according to the illustrative embodiment of the disclosures.

FIG. 9A is a chart showing an example of a switching operation when there is waiting data.

FIG. 9B is a chart showing an example of a switching operation when there is no waiting data.

DETAILED DESCRIPTION OF EMBODIMENT AND MODIFICATIONS

Figure 1:
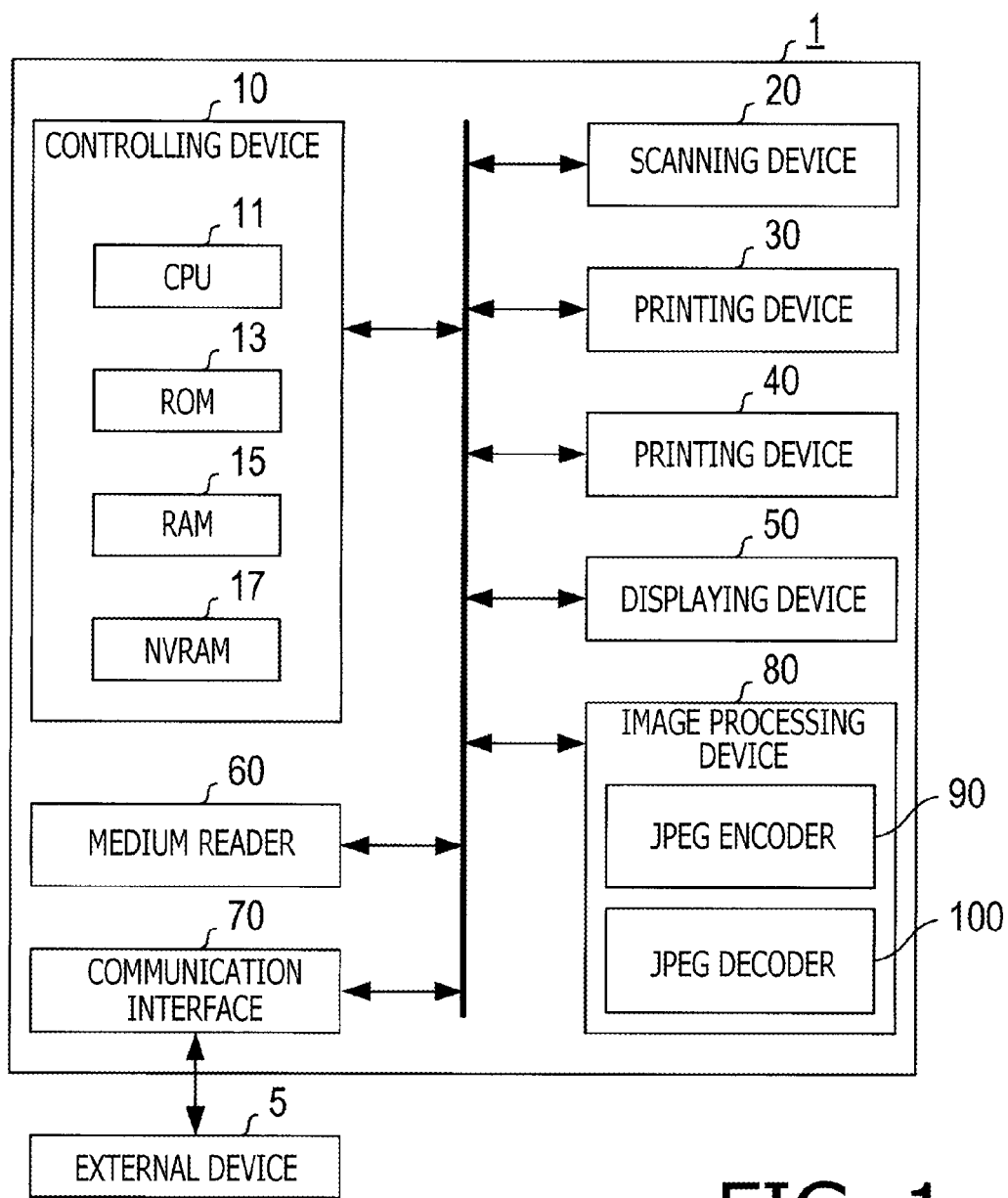
FIG. 1 is a block diagram schematically showing a configuration of a digital multi-function peripheral according to an illustrative embodiment of the disclosures.

A digital MFP (multi-function peripheral) 1 according to an illustrative embodiment shown in FIG. 1 is an apparatus having multiple functions including a printer function and a scanner function. The digital MFP 1 has a controlling device 10, a scanning device 20, a printing device 30, a displaying device 40, an operation device 50, a medium reader 60, a communication interface 70 and an image processing device 80.

The controlling device 10 has a CPU (central processing unit) 11, a ROM (read only memory) 13, a RAM (random access memory) 15 and an NVRAM (non-volatile RAM) 17. The CPU 11 is configured to execute processes in accordance with programs stored in the ROM 13 to control various components in the MFP 1 and realize respective functions. The RAM 15 is used as a working area when the CPU 11 executes various processes. The NVRAM 17 is an electrically rewritable non-volatile memory, and stores various pieces of data. An example of the NVRAM 17 is a flash memory.

The scanning device 20 has a configuration substantially similar to well-known scanners. The scanning device 20 operates under control of the controlling device 10 and generates image data representing a scanned image of an original sheet. The image data as generated by the scanning device 20 is converted into compressed image data by the image processing device 80 and stored in the RAM 15 or the NVRAM 17.

The printing device 30 has a configuration substantially similar to well-known inkjet printers. The printing device 30 operates under control of the controlling device 10 and forms an image on a printing sheet in accordance with image data of an image subject to print.

The displaying device 40 operates under control of the controlling device 10 and displays various pieces of information on a display. An example of the displaying device 40 is an LCD (liquid crystal display). The displaying device 40 is capable of displaying an image scanned by the scanning device 20 and/or a preview image of an image to be printed by the printing device 30.

The operation device 50 is a device through which a user operation regarding operations of the digital MFP 1 is input. The operation device 50 is provided with a touch panel arranged on a display of the displaying device 40 and/or a key group (i.e., a group of keys) arranged about the displaying device 40.

The medium reader 60 is configured such that a recording medium such a memory card can be connected thereto. The media reader 60 operates, under control of the controlling device 10, to read data stored in the recording medium. The data read from the recording medium is stored in the RAM 15 or the NVRAM 17. The medium reader 60 obtains, for example, image data subject to print and/or image data subject to display from the recording medium.

The communication interface 70 is an interface capable of communicating with an external device 5. An example of the external device 5 is a personal computer owned by the user. The communication interface 70 operates, under control of the controlling device 10, to provide the external device 5 with image data representing a scanned image of the original sheet and/or to obtain image data subject to print from the external device 5.

The image processing device 80 is configured to convert the image data generated by the scanning device 20 to JPEG compressed image data and to convert image data subject to the printing operation and/or displaying operation to uncompressed image data. The image processing device 80 has a JPEG encoder 90 configured to convert uncompressed image data into JPEG compressed image data, and a JPEG decoder 100 configured to convert JPEG compressed image data to uncompressed image data.

In the following description, the JPEG compressed image data will be simply referred to as compressed image data. It is noted that, in the following description, as a compression method, the JPEG compression method is employed. However, it is only an example and the compression method needs not be limited to the JPEG compression method. As other compression methods, JPEG 2000, JPEG XR and the like are known.

Figure 2:
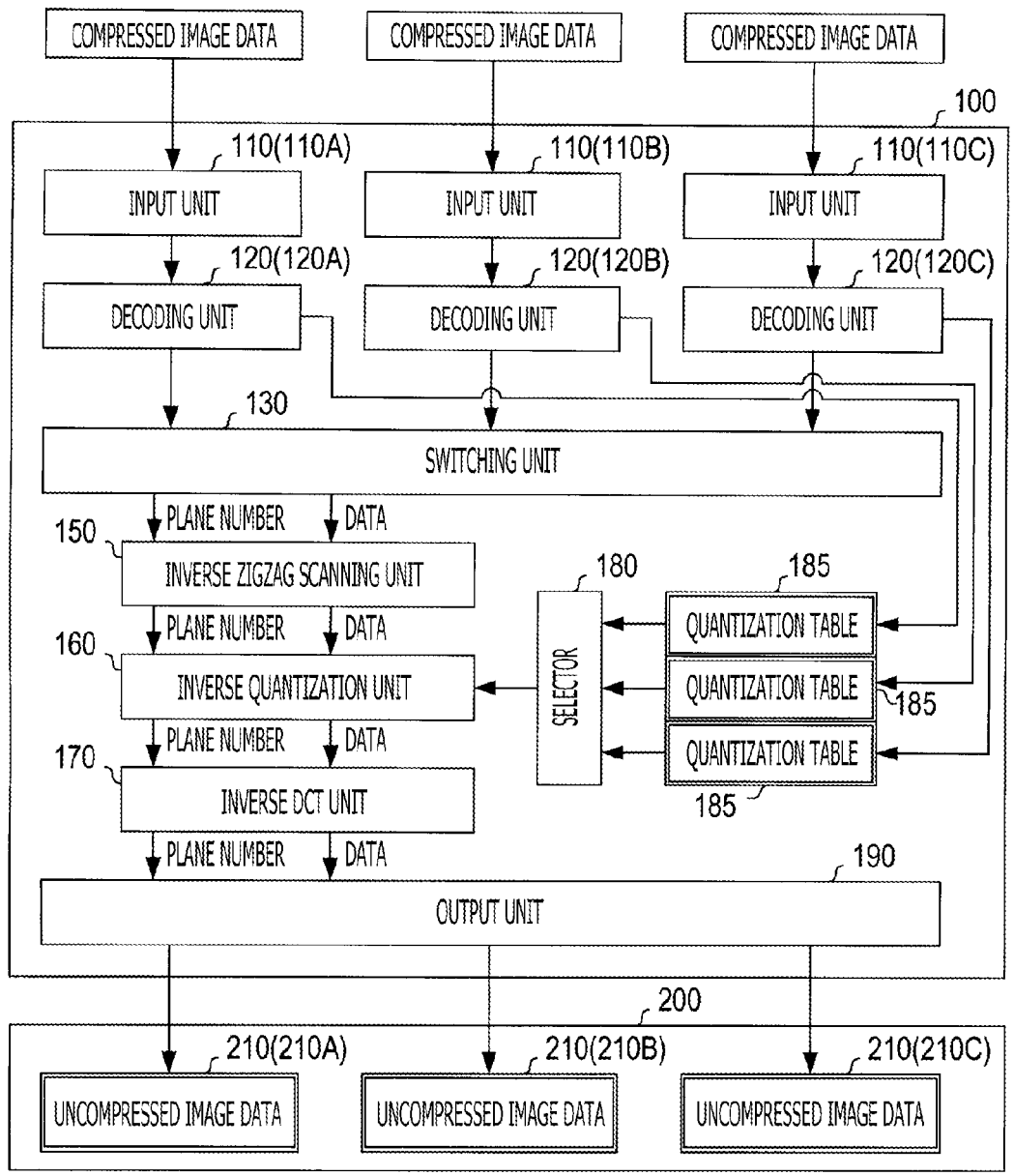
FIG. 2 is a block diagram of a JPEG decoder according to the illustrative embodiment of the disclosures.

As shown in FIG. 2, the JPEG decoder 100 is configured such that a plurality of pieces of compressed image data can be converted to respective pieces of uncompressed image data in parallel. According to the example shown in FIG. 2, the JPEG decoder 100 is capable of converting three pieces of compressed image data into three pieces of uncompressed image data, respectively and in parallel.

The JPEG decoder 100 has a plurality of input units 110 and a plurality of decoding units 120, a switching unit 130, an inverse zigzag scanning unit 150, an inverse quantization unit 160, an inverse DCT (discrete cosine transformation) unit 170, a table selector 180, a plurality of quantization table storages 185 and an output unit 190.

Each of the input units 110 receives the compressed image data from the controlling device 10 and transmits the same to the corresponding decoding unit 120 as a bit-stream (i.e., a serial bit string). Each of the decoding units 120 applies Huffman decoding to the compressed image data received from the corresponding input unit 110.

In the following description, in order to distinguish a plurality of pieces of the compressed image data input to respective input units 110, the plurality of pieces of compressed image data are referred to as zeroth plane of image data, a first plane of image data and a second plane of image data. Further, the input unit 110 and the decoding unit 120 for converting i-th plane of compressed image data (i=0, 1, 2) to the uncompressed image data will be referred to as an i-th plane input unit 110 and an i-th plane decoding unit 120. Any other components for processing the i-th plane image data will be referred to with a term "i-th plane" being affixed on a term expressing a component. It is noted that the variable "i" will be referred to as a plane number, hereinafter.

In particular, when the zeroth plane input unit 110, the zeroth plane decoding unit 120 and other components for the zeroth plane will be referred to, a suffix "A" will be added to their reference numbers (e.g., the input unit 110A, the decoding unit 120A). Similarly, when the first plane input unit 110, the first plane decoding unit 120 and other components for the first plane will be referred to, a suffix "B" will be added to their reference numbers (e.g., the input unit 110B, the decoding unit 120B). Further similarly, when the second plane input unit 110, the second plane decoding unit 120 and other components for the second plane will be referred to, a suffix "C" will be added to their reference numbers (e.g., the input unit 110C, the decoding unit 120C). When the surface number is not limited to one for describing purpose, the above-described affix or suffix will not be added.

Figure 3:
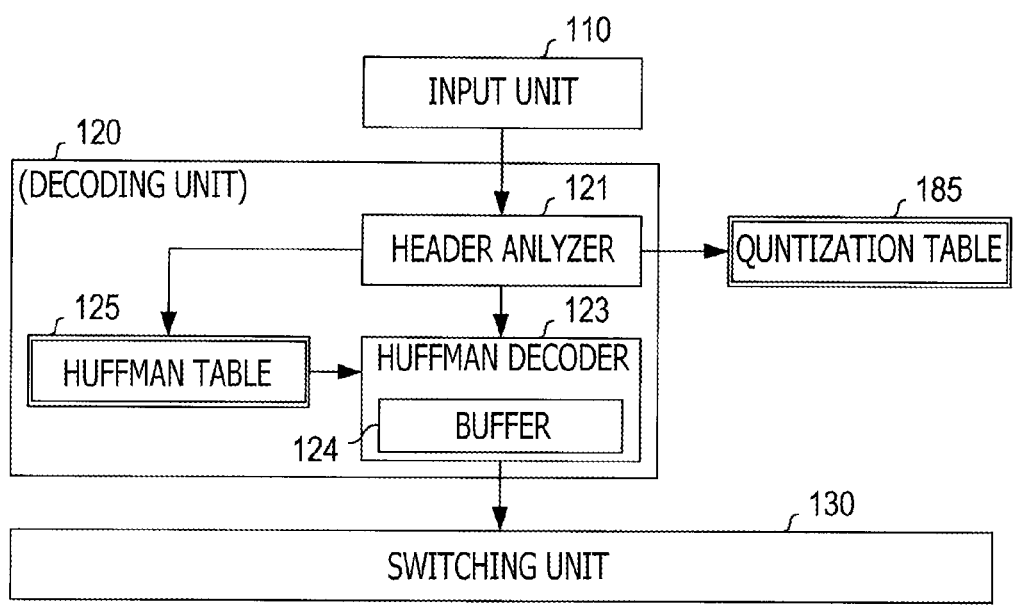
FIG. 3 is a block diagram of a decoding unit according to the illustrative embodiment of the disclosures.

As shown in FIG. 3, each of the decoding units 120 has a header analyzer 121, a Huffman decoder 123 and a Huffman table storage 125. The header analyzer 121 identifies a structure of the compressed image data by analyzing a header of the compressed image data received through the corresponding input unit 110. The header analyzer 121 further extracts, from the header, a Huffman table and a quantization table, which are necessary to convert the compressed image data into the uncompressed image data.

As is known, JPEG compressed image data is configured such that a start marker (SOI: start of image), a segment group, a body of image data and an end marker (EOI: end of image) are arranged in this order. The start marker represents a start of the compressed image data, and the end marker represents an end of the compressed image data.

The segment group includes definition information of the quantization table and the Huffman table. The header analyzer 121 refers to the segment group and extracts the Huffman table and the quantization table therefrom. Further, the header analyzer 121 stores the extracted Huffman table in a Huffman table storage 125, and the extracted quantization table in a corresponding quantization table storage 185.

The Huffman decoder 123 generates decoded data corresponding to the compressed image data by applying Huffman decoding to the compressed image data input, through the header analyzer 121, from the corresponding input unit 110. The decoded data is a bit stream of the quantization data.

The quantization data is configured to have a plurality of pixel blocks each of which is a minimum processing unit and referred to as an MCU (minimum coded unit) having a fixed data length. According to the JPEG compression method, image data subject to compress is divided into a plurality of sub-images each of which is defined by a predetermined number of pixels in a vertical direction and a predetermined number of pixels in a horizontal direction, and a discrete cosine transformation (DCT) and the quantization are applied to each of the plurality of sub-images, and then the Huffman decoding is applied. It is noted that the "pixel block" corresponds to one sub-image of a pixel area corresponding to a unit to which the DCT and the quantization are applied. According to the illustrative embodiment, one MCU corresponds to one pixel block. When a well-known 4:4:4 method is employed as the JPEG compression method, the image block is defined as an area of 8 pixels (vertical)×8 pixels (horizontal).

Thus, the Huffman decoder 123 sequentially processes the bit streams of the compressed image data received from the input units 110 through the analyzer 121 to convert the same to bit streams of the quantization data. The Huffman decoder 123 supplies the quantization data to be transmitted and has not yet been transmitted (hereinafter, also referred as waiting quantization data) to the switching unit 130 only when an ON signal is received as a ready signal, through a transmission path L3, from the switching unit 130. It is noted that the Huffman decoder 123 is provided with a buffer 124 configured to store the quantization data to be output.

The switching unit 130 is configured to transmit the quantization data generated by each of the zeroth plane decoding unit 120A, the first plane decoding unit 120B, and the second plane decoding unit 120C to the inverse zigzag scan unit 150 by every predetermined amount of data in association with the plane number.

According to the illustrative embodiment, the switching unit 130 repeated executes processes of selecting one decoding unit 120 subject to output from among the decoding unit 120A for the zeroth plane, the decoding unit 120B for the first plane and the decoding unit 120C for the second plane in accordance with a predetermined selection rule, and transmitting certain amount, corresponding to a predetermined number of blocks, of the quantization data generated by the selected decoding unit 120 to the inverse zigzag scanning unit 150. It is noted that the number blocks here represents the number of pixel blocks. In the following description, a pixel block will occasionally be referred to simply as a block.

The switching unit 130 transmits, by repeating the above processes, the quantization data to the inverse zigzag scanning unit 150 in association with the plane number, the amount of the quantization corresponding to the predetermined number of blocks. Every time when the quantization data corresponding to the predetermined number of blocks has been transmitted, a destination (i.e., the decoding unit 120) to which the quantization data is transmitted is switched from among the plurality of decoding units 120. As a result, the plurality of pieces of waiting quantization data respectively generated by the plurality of decoding units 120 and to be output to the inverse zigzag scanning unit 150 are transmitted thereto by every predetermined amount. In the following description, the number of blocks corresponding to the predetermined amount of data will occasionally be referred to as the number of switching blocks.

Figure 4:
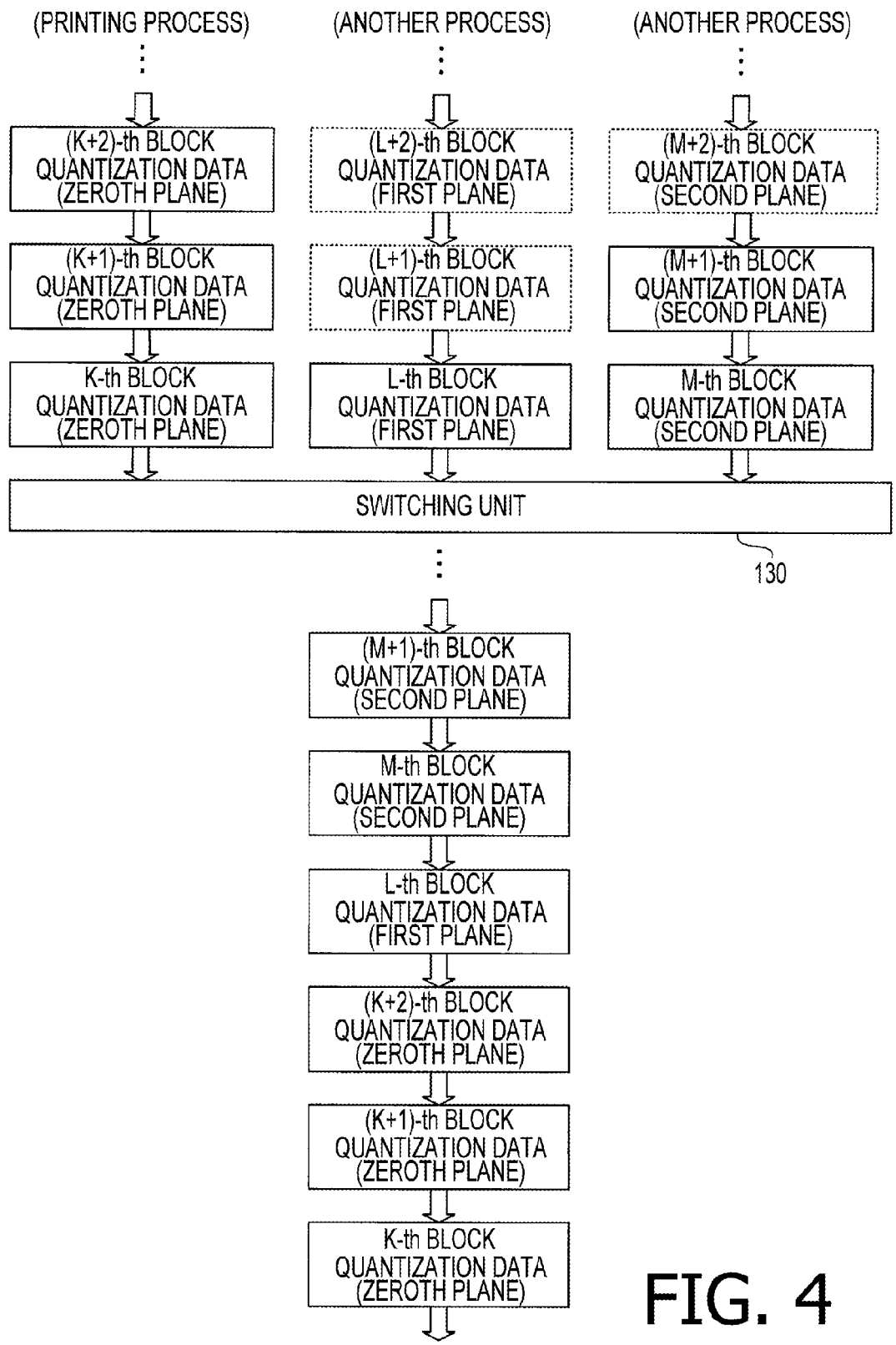
FIG. 4 is a chart illustrating a selection rule used to select a destination decoding unit employed in a switching unit according to the illustrative embodiment of the disclosures.

According to an example shown in FIG. 4, the number of switching blocks of the zeroth plane is three (3), the number of switching blocks of the first plane is one (1) and the number of switching blocks of the second plane is two (2). When the number of switching blocks are determined as above, and further the zeroth, first and second plane decoding units 120A, 120B and 120C are sequentially selected in accordance with the selection rule, the switching unit 130 repeatedly executes operations to output the zeroth plane quantization data by an amount corresponding to the three blocks, to output the first plane quantization data by an amount corresponding to one block, and to output the second plane quantization data by an amount corresponding to two blocks.

The inverse zigzag scanning unit 150, which receives the quantization data from the switching unit 130, is configured to execute an inverse process of a zigzag scanning process that is executed when image data is compressed. The zigzag scanning process is a process of converting two-dimensionally arranged quantization data into a one-dimensionally arranged quantization data for each pixel block.

The inverse zigzag scanning unit 150 converts the one-dimensionally (linearly) arranged quantization data received from the switching unit 130 to the two-dimensionally arranged quantization data for respective pixel blocks by applying an inverse process of the zigzag scanning process. Then, the inverse zigzag scanning unit 150 transmits the converted quantization data to the inverse quantization unit 160.

The inverse quantization unit 160 converts the quantization data received from the inverse zigzag scanning unit 150 to data before the quantization by applying an inverse quantization process, which is an inverse process of the quantization process executed when the image data is compressed, to the quantization data received from the inverse zigzag scanning unit 150.

When the image compression is executed, the uncompressed image data is divided into pixel blocks, the DCT is applied to the image data of each of the pixel blocks, and then the quantization process is applied. The data before quantization corresponds to image data of one of the pixel blocks constituting the uncompressed image data and DCT has been applied. It is noted that, in this specification, the image data which is a unit of pixel blocks constituting the uncompressed image data is also referred to the block data, and the image data generated by applying the DCT to the block data will occasionally be referred to as DCT image data.

That is, the inverse quantization unit 160 converts the quantization data input through the inverse zigzag scanning unit 150 per each pixel block into DCT image data. When the DCT image data is generated, the inverse quantization unit 160 retrieves the quantization table extracted by the header analyzer 121 through the table selector 180. The table selector 180 provides the quantization table which is stored in the quantization table storage 185 and corresponds to the plane number received from the inverse quantization unit 160 to the inverse quantization unit 160. The inverse quantization unit 160 transmits the generated DCT image data, together with the plane number which was received from the inverse zigzag scanning unit 150 in association with the quantization data, to the inverse DCT unit 170.

The inverse DCT unit 170 converts the DCT image data received from the inverse quantization unit 160 to the data before the DCT is applied by applying the inverse DCT process. It is noted that the data before the DCT is applied is the block data constituting one pixel block of the uncompressed image data. The inverse DCT unit 170 transmits the block data obtained by applying the inverse DCT process to the DCT image data together with the plane number which is received from the inverse quantization unit 160 in association with the DCT image data, to the output unit 190.

The output unit 190 writes the block data received from the inverse DCT unit 170, based on the plane number input in association with the block data, in the uncompressed image data storage 210 corresponding to the plane number in the storage unit 200. It is noted that the storage unit may be the RAM 15 or may be a built-in memory of the image processing device 80 provided separately from the RAM 15.

When the plane number received in association with the block data is zero, the output unit 190 writes the block data in the storage area 210A (for the zeroth plane) which is the storage area to store uncompressed image data corresponding to the uncompressed image of the zeroth plane.

Similarly, the output unit 190 writes the block data of the first plane received from the inverse DCT unit 170 into the storage area 210B for the first plane, and writes the block data of the second plane into the storage area 210C for the second plane. As above, the JPEG decoder 100 forms the uncompressed image data composed of a group of pieces of block data in the corresponding storage areas 210A, 210B and 210C in the storage unit 200, for each piece of compressed image data.

Figure 5:
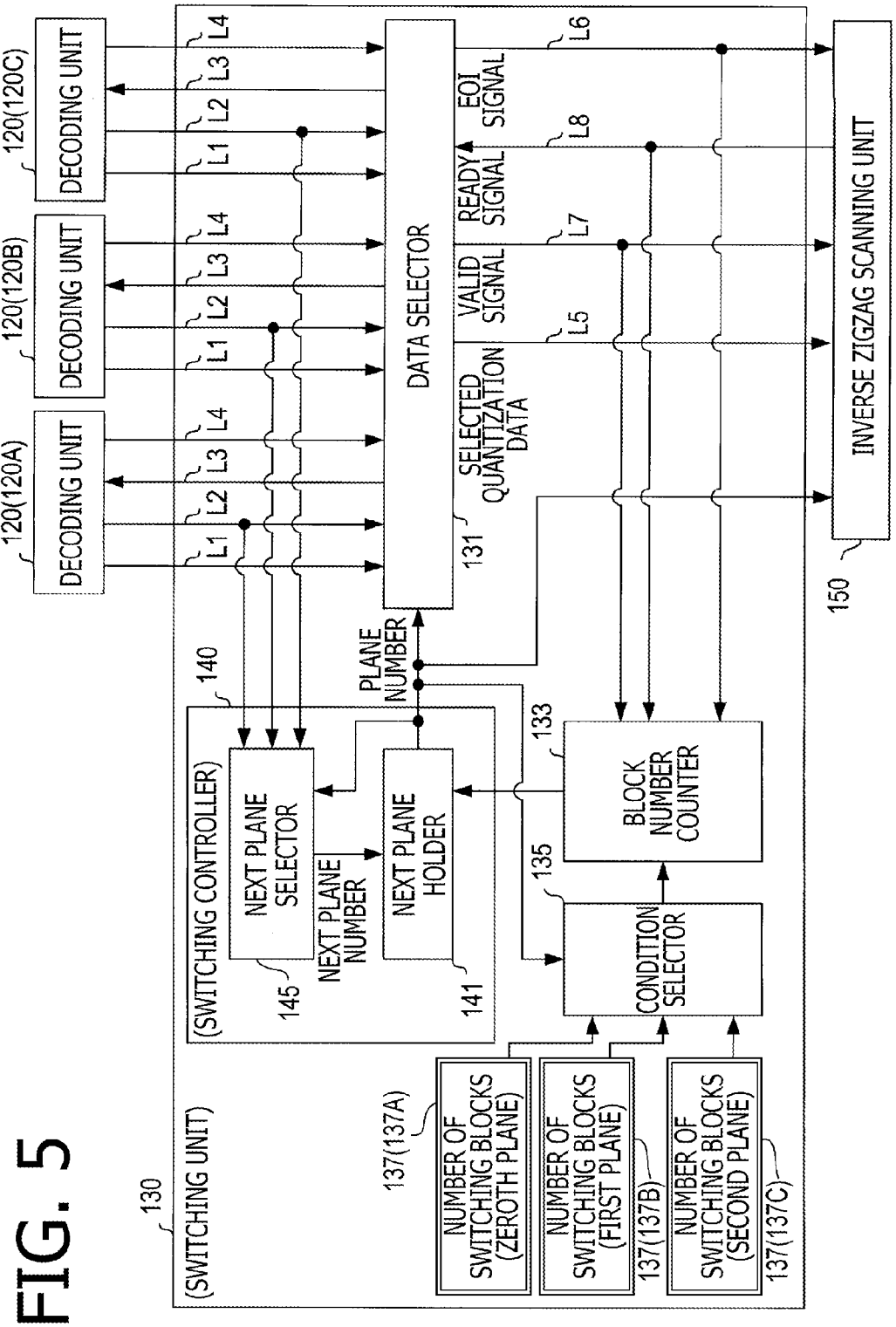
FIG. 5 is a block diagram showing a configuration of the switching unit according to the illustrative embodiment of the disclosures.

Next, the switching unit 130 will be described in detail. As shown in FIG. 5, the switching unit 130 is provided with a data selector 131, a block number counter 133, a condition selector 135, a plurality of condition storages 137 and the switching controller 140.

The data selector 31 selects one of the zeroth plane decoding unit 120A, the first plane decoding unit 120B and the second plane decoding unit 120C as the destination, and transmits the quantization data received from the selected destination decoding unit 120 to the inverse zigzag scanning unit 150. The data selector 131 operates to select the decoding unit 120 corresponding to the plane number received from the switching controller 140 as the destination.

Between each of the decoding units 120 and the selector 131, a transmission path L1 of the quantization data, a transmission path L2 for valid signal, the transmission path L3 of the ready signal and transmission path L4 for the EOI signal are provided as shown in FIG. 5.

The data selector 131 switches the ready signal corresponding to the decoding unit 120 selected as the destination to the ON signal, and switches the ready signals for the other decoding units 120 to the OFF signals, and transmits the thus switched ready signals to respective decoding units 120. The transmission path L3 of the ready signal connects each decoding unit 120 and the data selector 131, and the ready signal which is ON/OFF switched as above is transmitted from the data selector 131 to the decoding unit 120. Each of the decoding units 120 transmits the waiting quantization data to the data selector 131 when the received ready signal is the ON signal.

Further, each of the decoding units 120 transmits the ON signal as the valid signal to the data selector 131 and the switching controller 140 when there exists the waiting quantization data, while transmits the OFF signal as the valid signal to the data selector 131 and the switching controller 140 when there does not exist the waiting quantization data. The transmission path L2 of the valid signal connect respective decoding units 120 to the data selector 131, and connect the respective decoding units 120 to the switching controller 140, and transmit the thus ON/OFF switched valid signals from the respective decoding units 120 to the switching controller 140 and the data selector 131.

Further, each of the decoding units 120 transmits the ON signal as the EOI signal to the data selector 131 when the last one block of quantization data of the bit stream of the quantization data corresponding to the compressed image data to the data selector 131, otherwise transmits the OFF signal as the EOI signal to the data selector 131 (see FIGS. 7A-7G). The transmission paths L4 of the EOI signal connect respective decoding units 120 to the data selector 131, and transmit the thus ON/OFF switched EOI signal from the decoding units 120 to the data selector 131.

The data selector 131 transmits the EOI signal received from the decoding unit 120 selected as the output target to the inverse zigzag scanning unit 150 together with the corresponding quantization data. Between the data selector 131 and the inverse zigzag scanning unit 150, a transmission path L6 of the EOI signal, a transmission path L7 of the valid signal and a transmission path L8 of the ready signal are provided in addition to the transmission path L5 of the quantization data.

The data selector 131 transmits the valid signal to the inverse zigzag scanning unit 150. The valid signal is transmitted as the ON signal when there is quantization data from the decoding units 120, while transmitted as the OFF signal when there is no quantization data transmitted from the decoding units 120. The valid signal is also transmitted to the block number counter 133.

To the block number counter 133, the ready signal from the inverse zigzag scanning unit 150 is also transmitted. The inverse zigzag scanning unit 150 transmits the ON signal to the data selector 131 and the block number counter 133 as the ready signal when new quantization data is receivable, while transmits the OFF signal as the ready signal to the data selector 131 and the block number counter 133 when the quantization data is not receivable.

As above, the inverse zigzag scanning unit 150 ON/OFF switches the ready signal for each pixel block, and receives the quantization data for each pixel block. The data selector 131 transmits one block of quantization data to the inverse zigzag scanning unit 150 every time when the ready signal is switched from the OFF signal to the ON signal.

The block number counter 133 detects transmission of one block of quantization data from the data selector 131 to the inverse zigzag scanning unit 150 has been completed every time when one block of the quantization data is output based on the valid signal output by the data selector 131 and the ready signal output by the inverse zigzag scanning unit 150. In accordance with the detection result, the block number counter 133 increments the count every time when the one block of quantization data is transmitted, thereby the block counter 133 counting the number of pixel blocks transmitted to the inverse zigzag scanning unit. The block number counter 133 compares the number of switched blocks received from the condition selector 135 with the count value when the count number is updated (i.e., incremented).

The condition selector 135 transmits the switched block number stored in the condition storage 137, from among the plurality of condition storages 137, corresponding to the plane number transmitted from the switching controller 140 to the data selector 131, to the block number counter 133. It is noted that the condition storage 137A for the zeroth plane stores the number of switched blocks of the zeroth plane, the condition storage 137B for the first plane stores the number of switched blocks of the first plane, and the condition storage 137C for the second plane stores the number of blocks of the second plane. The controlling device 10 is configured to set or update each of the number of switching blocks by writing the number of switching blocks with respect to the condition storages 137A, 137B and 137C. Writing of the number of switched blocks is executed, for example, every time when the JPEG decoder 100 is started, or new compressed image data is transmitted to the JPEG decoder 100.

The block number counter 133 resets the count to zero and outputs the ON signal as the switching signal when the count is updated and the updated count number coincides with the number of the switched block number. Otherwise, the block number counter 133 outputs the OFF signal as the switching signal, while updates the count number when one block of the quantization data is transmitted to the inverse zigzag scanning unit 150. The switching signal is transmitted to a process plane number holder 141 provided to the switching controller 140.

Further, to the block number counter 133, the EOI signal is transmitted from the data selector 131. The EOI signal is also transmitted from the data selector 131 to the inverses zigzag scanning unit 150. The block number counter 133 transmits the ON signal as the switching signal to the process plane number holder 141 when the EOI signal is switched from the ON signal to the OFF signal, regardless of a relationship between the count value and the number of the switched blocks.

The switching controller 140 has the process plane number holder 141 and a next plane selector 145. The process plane number holder 141 stores a next plane number received from the next plane selector 145 every time the switching signal is switched to the ON signal, and the transmits the stored plane number to the data selector 131, the condition selector 135 and the inverse zigzag scanning unit 150.

The next plane selector 145 selects the number of the plane to be transmitted from the process plane number holder 141 to the data selector 131 as the next process plane number based on the plane number transmitted from the process plane number holder 141 to the data selector 131. The plane number to be transmitted to the data selector 131 is the plane number of the decoding unit 120 selected as the output target by the data selector 131. In this example, the plane number transmitted from the process plane number 141 to the data selector 131 is also referred to as a process plane number.

According to the illustrative embodiment, the next plane selector 145 selects the plane number of the decoding unit 120 having the highest priority as the next plane number from among the decoding units 120 having the waiting quantization data, based on the process plane number. Whether the decoding unit 120 has the waiting quantization data can be determined based on whether the valid signal output by the decoding unit 120 is the ON signal or not.

When the processing plane number is X, the decoding unit 120 of which priority is the highest is the decoding unit 120 for the plane of which plane number Y=mod(X+1, C). It is noted that the function mod($\alpha$, $\beta$) is defined as a remainder when $\alpha$ is divided by $\beta$. The constant C represents the plane number which corresponds to the number of the decoding units 120. According to the illustrative embodiment, the number of the decoding units 120 is three, the constant C is three. When the plane number for the decoding unit 120 of which the priority is the highest is Y, the plane number for the decoding unit 120 of which priority is P-th is represented by mod(Y+(P−1), C), where P=1, 2, . . . .

Thus, according to the illustrative embodiment, when the processing plane number X is zero (i.e., X=0), the decoding unit 120 for which the priority is the highest is the decoding unit 120B for the first plane, the decoding unit 120 for which the priority is second is the decoding unit 120C for the second plane, and the decoding unit of which the priority is third is the decoding unit 120A for the zeroth plane. When the processing plane number X is two (i.e., X=2), the decoding unit 120 of which the priority is first is the decoding unit 120A for the zeroth plane, the decoding unit 120 of which the priority is second is the decoding unit 120B for the first plane, and the decoding unit 120 of which the priority is third is the decoding unit 120C for the second plane.

That is, when the processing plane number X is equal to zero, the next plane selector 145 prepares for next selection such that the data selector 131 selects the decoding unit 120B for the first plane by selecting one (1) as the next plane number on condition that the valid signal of the decoding unit 120B for the first plane of which the priority is first is ON.

When the valid signal of the decoding unit 120B for the first plane is OFF, the next plane selector 145 prepares for the next selection such that the data selector 131 selects the decoding unit 120C for the second plane of which priority is next highest (i.e., second priority) by selecting two (2) as the next plane number on condition that the valid signal of the decoding unit 120C for the second plane of which priority is second is ON.

When the valid signal of the decoding unit 120B for the first plane is changed from the OFF signal to the ON signal before the switching signal changes from the OFF signal to the ON signal, the next plane selector 145 operates to change the next plane number from two (2) to one (1).

As the switching controller 140 operates in this manner, each of the decoding units 120 is selected as the output target in order so that decoding units 120 are cyclically selected as the output targets. Each of the decoding units 120 transmits the quantization data of which amount corresponds to the number of the switched blocks to the data selector 131 every time when selected as the output target. The quantization data transmitted to the data selector 131 is then transmitted to the inverse zigzag scanning unit 150, and stored, as the block data, in the storage area 120 corresponding to the plane number.

The operation of the switching unit 130 will be described in detail, referring to FIGS. 6A-6F. According to the illustrative embodiment, the switching block number for the zeroth plane is three. Therefore, when the decoding unit 120A for the zeroth plane is selected as the output target, the switching signal will not be generated until the quantization data for the zeroth plane is transmitted from the data selector 131 to the inverse zigzag scanning unit 150 by an amount corresponding to the three blocks. That is, before the three blocks of the quantization data for the zeroth plane is output, as far as the EOI signal of the output target is the OFF signal, the switching signal will not be generated.

Accordingly, as shown in FIGS. 6A-6F, even if the valid signal for the zeroth plane is turned to the OFF signal when the three blocks of quantization data for the zeroth plane is being output, the switching unit 130 operates not to change the output target. The switching unit 130 awaits until the valid signal for the zeroth plane is changed back to the ON signal, and then operates to transmit the quantization data for the zeroth plane by the amount corresponding to the three blocks without fail.

The term "switch" indicated below FIG. 6F represents a timing at which the switching signal transmitted from the block number counter 133 to the process plane number holder 141 is changed to the ON signal. This timing corresponds to a timing at which the process plane number holder 141 stores the next plane number received from the next plane selector 145, and a timing at which the plane number transmitted from the process plane number holder 141 to the data selector 131 is updated.

An operation of the switching unit 130 when the EOI signal is turned ON/OFF, referring to FIGS. 7A-7G. According to the illustrative embodiment, there is a possibility that, before the quantization data corresponding to the number of switching blocks is transmitted from the destination decoding unit 120 to the inverse zigzag scanning unit 150, all the quantization data for the plane may have been transmitted. Therefore, the block number counter 133 transmits the ON signal to the process plane number holder 141 as the switching signal when the EOI signal is turned to the ON signal and then turned to the OFF signal.

For example, a case is assumed, in which, the destination is the zeroth plane decoding unit 120A, and the last quantization data of the zeroth plane is transmitted to the inverse zigzag scanning unit 150 under a condition where the number of the blocks having been transmitted to the inverse zigzag scanning unit 150 has not reached the switching block number "three (3)." In such a case, the EOI signal is switched to the ON signal when the last quantization data is transmitted to the inverse zigzag scanning unit 150, and the EOI signal is turned to the OFF signal when the transmission of the quantization data has been completed. When the EOI signal is turned to the OFF signal, the switching signal is transmitted to the process plane number holder 141 and the process plane number is switched. According to the illustrative embodiment, as above, when the EOI signal is changed from the ON signal to the OFF signal, the plane number is switched regardless of the number of the switching blocks.

The decoding unit 120, which has output all the quantization data, then continuously outputs the OFF signal as the valid signal since there is no waiting quantization data. Accordingly, the switching unit 130 will not select the decoding unit 120 of which output of the quantization data has been completed. Therefore, the switching unit 130 would not select the decoding unit of which the quantization data has been transmitted as the destination.

Therefore, according the JPEG decoder 100 described above, after all the pieces of the quantization data corresponding to one piece of compressed image data has been completed, the JPEG decoder 100 is capable of efficiently converting the remaining pieces of compressed image data to the uncompressed image data.

According to the JPEG decoder 100 described above, a plurality of pieces of compressed image data can be converted to the plurality of pieces of converted image data in parallel, respectively. Further, when the conversion process is applied, the Huffman decoding of respective compressed image data is executed in respective Huffman decoders 123 (i.e., the decoding unit 120), while the quantization data for respective pixel blocks which are generated by Huffman decoding is processed by the common circuit. The common circuit includes the inverse zigzag scanning unit 150, the inverse quantization unit 160 and the inverse DCT unit 170.

Therefore, according to the illustrative embodiment, as a JPEG decoder capable of converting a plurality of pieces of compressed image data into a plurality of pieces of uncompressed image data, in parallel and respectively, and as a JPEG decoder of which circuit is relatively compact, can be provided as the JPEG decoder 100.

Further, the quantization data generated by the decoding unit 120 is transmitted to downstream common circuits for each piece of the compressed image data, at a predetermined unit of block number which is determined individually. According to the illustrative embodiment, the switching unit 130 cyclically switches the destination decoding units 120 so that a plurality of decoding units 120 are switched in a predetermined order, then the waiting quantization data is output by an amount corresponding to the switching block number, which is the above-described number of blocks determined individually.

Therefore, according to the illustrative embodiment, by adjusting setting values of the switching blocks, assignment ratio of the common circuits for respective pieces compressed image data is changed, thereby the data processing speed in the common circuits can be adjusted among a plurality of pieces of compressed image data.

As is known, when the compressed image data is converted into the uncompressed image data, process load in the inverse DCT largely affects throughput of the entire process. According to the illustrative embodiment, the assignment ratio with respect to the common circuits including the inverse DCT conversion unit can be changed by adjusting the number of switching blocks. Therefore, according to the illustrative embodiment, by simply adjusting the conversion speeds of the plurality of pieces of the compressed image data are adjusted, the plurality of pieces of the compressed image data can be converted into the plurality of pieces of uncompressed image data efficiently and at appropriate speeds, respectively.

According to the illustrative embodiment, the number of switching blocks for the compressed image data subject to print is greater than that for other compressed image data. As a result, the compressed image data subject to print is converted to the uncompressed image data at a higher speed than the other compressed image data. Therefore, according to the illustrative embodiment, a problem that the throughput of the printing process is lowered due to delay of conversion of the compressed image data to the uncompressed image data can be suppressed.

As a result, even if the JPEG decoder 100 is shared between the compressed image data subject to print and the compressed image data subject to other operations, an unfavorable effect on the printing process due to share of the JPEG decoder 100 can be suppressed. In the digital MFP 1, usage frequency of the printing function is generally higher than that of the other functions. Accordingly, it is beneficial for the user if the assignment ratio of the common circuits with respect to the compression data subject to print is made higher.

When the JPEG decoder 100 is configured to operate such that the priority in converting the compressed image data subject to print to the uncompressed image data is higher, the number of switching blocks may be determined at a designing stage as follows.

Firstly, the designer may determine that the number of the switching blocks with respect to the compressed image data subject to print is the number of blocks of the uncompressed image data that can be stored in the storage area 210 at a writing speed corresponding to the execution speed of the printing process. Then, based on the total number of blocks of the quantization data the switching unit 130 can output to the common circuits during a period within which the plurality of decoding units 120 are determined to be the destinations, respectively once, the number of remaining switching blocks which is calculated by subtracting the number of switching blocks of the compressed image data subject to print from the total number of switching blocks is distributed among the remaining compressed image data (i.e., decoding units 120).

The thus determined numbers of the switching blocks for respective compressed image data are stored in the NVRAM 17 or the ROM 13, and the digital MFP 1 is configured such that the controlling device 10 retrieves the same and set the same to the JPEG decoder 100, the compressed image data subject to print can be converted into the uncompressed image data at a desired speed with a higher priority.

For example, when the conversion speed of the JPEG decoder 100 in terms of the data output speed of the output unit 190 is 120 ppm and, as the throughput of the printing process, 50 ppm is required, the number of the switching blocks of the zeroth plane corresponding to the compressed image data subject to print may three, and the sum of the numbers of the first and second plane switching blocks may also be three. In such a case, the conversion speed of the image data subject to print is 60 ppm in terms of the data output speed of the output unit 190, which satisfies the required speed of 50 ppm.

According to the illustrative embodiment, when a decoding unit 120 does not have the waiting quantization data, the switching unit 130 does not select the decoding unit 120 as the destination, but selects the next decoding unit 120 so that the waiting quantization data the next decoding unit 120 is transmitted to the common circuits. Therefore, according to the illustrative embodiment, with use of the common circuits, the compressed image data can be efficiently converted into the uncompressed image data.

First Modification

Figure 8A:
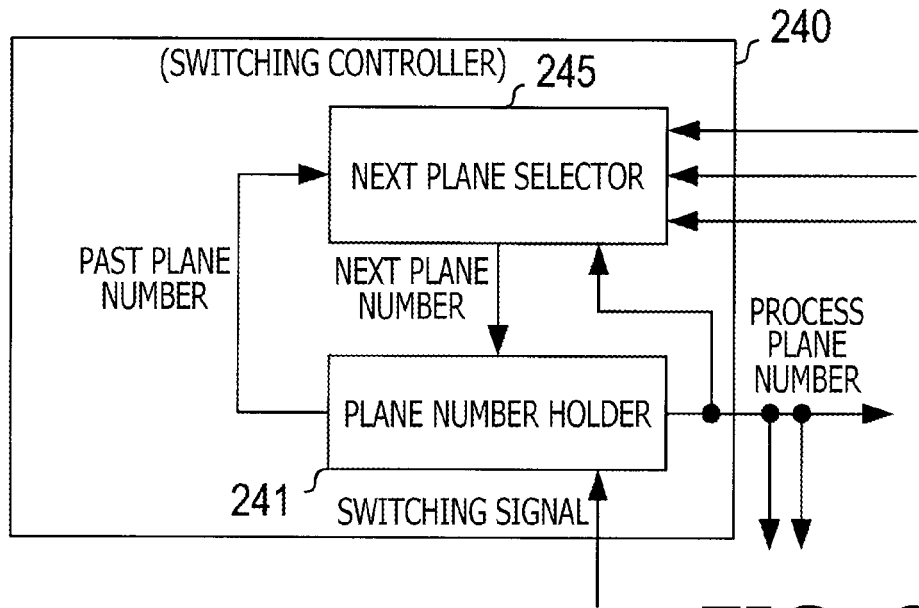
FIG. 8A shows a block diagram of a switching controller according to a first modification of the illustrative embodiment.

Hereinafter, modifications of the above-described illustrative embodiment will be described. In a first modification, the digital MFP 1 has a switching controller 240 as shown in FIG. 8A instead of the switching controller 140 of the illustrative embodiment. Since the other configuration is the same as the illustrative embodiment, the configuration of the switching controller 240 will be described in detail.

As shown in FIG. 8A, the switching controller 240 has a process plane number holder 241 corresponding to the process plane number holder 141 and a next plane selector 245 corresponding to the next plane selector 145. The process plane number holder 241 is configured to store, in addition to a current process plane to be input to the data selector 131, a predetermined number of previous process plane numbers including a previous process plane number and further previous process plane number transmitted to the data selector 131. The previous process plane numbers are transmitted to the next plane selector 245 together with the current process plane number, and are used to determine the next process plane number.

Based on the previous process plane numbers and current process plane number, the next plane selector 245 identifies how often the decoding units 120 were selected (i.e., selected count) during a period from now to the past, by the predetermined times before, for each plane. Then, the next plane selector 245 operates to select the plane number of the less frequently selected from among the decoding units 120 having the waiting quantization data as the next process plane number. If there are a plurality of decoding units 120 which are less frequently selected, as is done in the illustrative embodiment, one having the highest priority among the decoding units 120 of which the selection count is the smallest is selected as the next process plane number.

An example of an operation of the next plane selector 245 will be described, referring to FIGS. 9A and 9B. FIG. 9A shows an example in which the next process plane number is selected when the current process plane number is zero and each of the decoding units 120 has the waiting quantization data.

When the current process plane number is zero, according to the illustrative embodiment, the next process plane number will be one. Similarly, according to the first modification, as far as the selection counts are not dispersed, the next process plane number will be one.

If the selection counts are not dispersed, when the selected time of the zeroth plane is 10, the selected counts of the first and second planes are nine. Accordingly, the decoding units 120 which are least frequently selected are the first and second plane decoding units 120B and 120C, and the decoding unit 120 having the highest priority among the first and second plane decoding units 120B and 120C is the first plane decoding unit 120B.

Thereafter, when the switching signal is generated and the current process plane number is changed to one, the next plane selector 245 selects two as the next process plane number in accordance with the selection rule described above. Further switching signal is generated and the current process plane number is further changed to two, the next plane selector 245 selects zero as the next process plane number.

FIG. 9B shows an example which shows how the next process plane is selected when the current process plane number is zero, and the first plane decoding unit 120B does not have the waiting quantization data. according to this example shown in FIG. 9B, the second plane decoding unit 120B has waiting quantization data.

When the current process plane number is zero, and when the selection count is not dispersed, the decoding units 120 of which the selection counts are the smallest are the first and second plane decoding units 120B and 120C. It is noted that, if the first plane decoding unit 120B does not have the waiting quantization data, according to the rule above, two is selected as the next process plane number.

Thereafter, when the switching signal is generated and the current process plane number is changed to two, and the first plane decoding unit 120B still does not have the waiting quantization data, the next plane selector 245 selects zero as the next process plane number.

As above, when the first plane decoding unit 120B does not have the waiting quantization data, the selection counts of the respective planes are dispersed. Therefore, when a further switching signal is generated and the current process plane number is changed to zero and then the first plane decoding unit 120B becomes in a state of having the waiting quantization data, the next plane selector 245 select the plane number 1 of the decoding unit 120B which has the smallest selection count among the decoding units 120A, 120B and 120C each has the waiting quantization data as the next process plane selection number.

Thereafter, when the switching signal is generated and the current process plane number is changed to one, among the decoding units 120 (e.g., 120B and 120C) which have the smallest selection count and the decoding unit 120 which has the waiting quantization data and the highest priority is still the first plane decoding unit 120B. Accordingly, the next plane selector 245 selects one as the next process plane number.

Thereafter, a further switching signal is generated and the current process plane number is changed to one, the disperse of the selection counts can be resolved. Therefore, the next plane selector 245 selects the plane number 2 of the decoding unit 120C having the smallest selection count from among the decoding units 120 having the waiting quantization data and the smallest selection count.

By selecting the next process plane number in accordance with the selection rule described above, the next plane selector 245 selects the next process plane number so that the disperse of the selection counts is suppressed, if there occurs the disperse of the selection counts.

Therefore, according to the first modification, the conversion speed of converting each piece of the compressed image data to the uncompressed image data can be controlled accurately. It is noted that the amount of the past data of the processed plane number held by the process plane number holder 241 is determined by a designer as the designer evaluates to what extent the selection counts may be dispersed and sets the amount so that the disperse can be resolved.

Second Modification

Figure 8B:
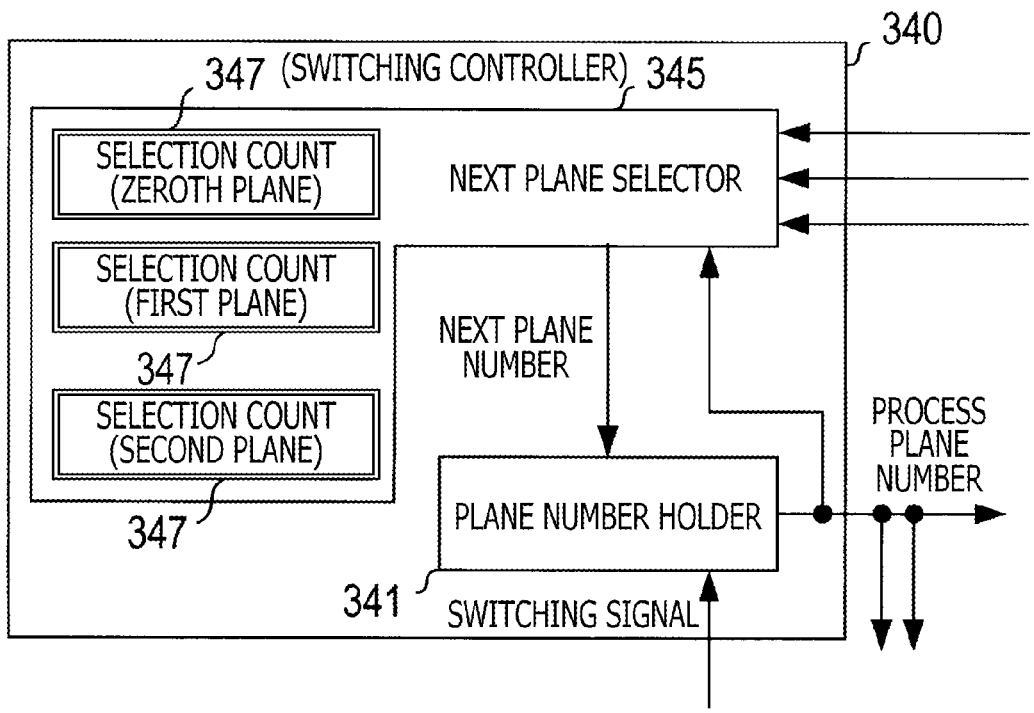
FIG. 8B shows a block diagram of a switching controller according to a second modification of the illustrative embodiment.

According to a second modification, the digital MFP 1 has a switching controller 340 shown in FIG. 8B instead of the switching controller 240. Since the other configuration is the same as that of the illustrative embodiment, the configuration of the switching controller 340 according to the second modification will be described, referring to FIG. 8B.

As shown in FIG. 8B, the switching controller 340 has a process plane number holder 341 corresponding to the process plane number holder 241 according to the illustrative embodiment, and a next plane selector 345 corresponding to the next plane selector 245 according to the illustrative embodiment.

The switching controller 340 according to the second modification, the next plane selector 345 selects the next process plane number in accordance with the same rule as in the first modification. Further, the process plane number holder 341 has the same configuration as that of the process plane number holder 141 according to the illustrative embodiment.

It is noted that the next plane selector 345 has a plurality of selected count holders 347. Each of the plurality of selected count holders 347 is configured to store the count (i.e., the selected count) by which the decoding unit 120 of the corresponding plane has been selected. The next plane selector 345 monitors the process plane number transmitted from the process plane number holder 341 to the data selector 131, and updates the selected count held by the corresponding selected count holder 347 every time when the process plane number is switched. The next plane selector 345 selects the next process plane in accordance with the rule employed in the first modification, based on the selected counts held by the selected count holders 347 corresponding to the respective planes, and the current process plane number. Thus, according to the second modification, the same effect obtained by the first modification can be obtained.

Third Modification

Figure 10:
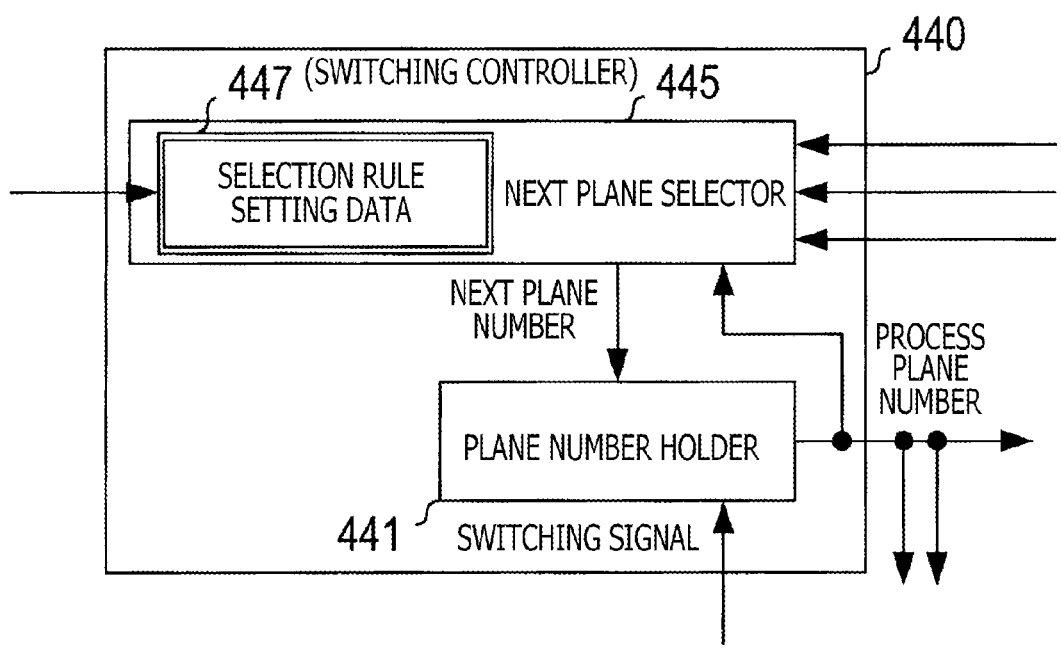
FIG. 10 is a block diagram of a switching controller according to a third modification of the illustrative embodiment.

In the foregoing description, how information of the selection rule is implemented in the next plane selectors 145, 245 and 345 is not mentioned. Such information regarding the selection rule may be fixedly implemented to the next plane selectors 145, 245 or 345 by means of hardware circuits. Alternatively, as shown in FIG. 10, such information may be held in the next plane selector 445 in the form of setting data.

A switching controller 440 according to the third modification (see FIG. 10) has a process plane number holder 441 corresponding to the process plane number holders 141, 241 and 341, and a next plane selector 445 corresponding to the next plane selectors 145, 245 and 345.

The next plane selector 445 has a storage 447 configured to store the setting data of the selection rule, and select the next process plane number in accordance with the selection rule following the setting data stored in the storage 447. The setting data may include, for example, definition information defining priority described in the illustrative embodiment, and may select the next process plane number in accordance with the definition information of the priority represented by the setting data.

Alternatively, the setting data may include operational formulae or parameters representing the selection rule. For example, the next plane selector 445 may operate in any of a plurality of operation modes corresponding to different rules, respectively, and the setting data may be data designating one of the plurality of operation modes.

The controlling device 10 may be configured to write the setting data in the storage 447. If the JPEG decoder 100 is configured such that setting rules are stored as respective pieces of setting data, appropriate pieces of setting data respectively corresponding to a plurality of products may be stored in the storage 447, thereby a highly versatile JPEG decoder 100 may be configured. It is noted that the other components of the JPEG decoder according to the third modification are substantially similar to those of the illustrative embodiment, the first modification and/or the second modification.

Further Modifications

It is noted that the present disclosures do not intended to limit the invention to the configuration of the above-described illustrative embodiment and modifications.

In the illustrative embodiment, as an example, it is described that 1 MCU corresponds to 1 pixel block. It is only an example and 1 MCU may correspond to a plurality of pixel blocks. Therefore, the switching unit 130 may be configured to switch the destination decoding units 120 every time when a predetermined amount, which corresponds to a predetermined units of MCU, of the quantization data is output, the destination decoding units 120 may be switched. That is, a switching condition to switch the destination for the switching unit 130 may be defined by the number of MCUs instead of the number of pixel blocks.

Further, according to the illustrative embodiment described above, the JPEG decoder 100 is provided with the input unit 110 and the header analyzer 121 for each of the plurality of pieces of compressed image data. However, the present disclosures should not be limited to the configuration which is described with reference to the illustrative embodiment, and can be modified in various ways. For example, only one input unit 110 and one header analyzer 121 may be provided. In such a case, a selector may be provided between the header analyzer 121 and the Huffman decoder 123. Such a selector operates to diverge the compressed image data transmitted from the header analyzer 121 to the corresponding Huffman decoder 123.

It is further noted that, in the illustrative embodiment, the JPEG decoder 100 is configured to convert a plurality of pieces of the compressed image data, which may be subject to printing and/or displaying, to the plurality of pieces of the uncompressed image data in parallel. It is noted that the disclosures should not be limited to the such a configuration. For example, the JPEG decoder 100 may be provided to various apparatuses which execute other operations. For example, in an apparatus in which various application programs are executed in parallel, there may occur a case where a plurality of application programs require, at the same time, uncompressed image data corresponding to the compressed image data. In such a case, the above-described JPEG decoder 100 operates advantageously in comparison with other types of JPEG decoder (e.g., conventional JPEG decoders).

When conversion of the compressed image data subject to display is given priority, the number of switching blocks may be determined by determining the number of switching blocks of the compressed image data subject to display firstly, and thereafter, the number of switching blocks of the compressed image data for other process may be determined.

It is noted that the Huffman decoder 123 is an example of a decoder, and the inverse zigzag scanning unit 150, the inverse quantization unit 160 and the inverse DCT unit 170 are examples of a converter. Further, the output unit 190 is an example of a writing controller, and the process plane number holders 141, 241, 341 and 441 are examples of a stored data updater. The buffer 124 is an example of a data storage. Further, the switching unit 130 is an example of a switcher.

What is claimed is:

1. A converting apparatus configured to convert a plurality of pieces of encoded compressed image data to a plurality of pieces of uncompressed image data, respectively, by decoding each of the plurality of pieces of encoded compressed image data, the converting apparatus comprising:
 a plurality of decoders each of which is configured to apply Huffman decoding to one of the plurality of pieces of compressed image data so that a plurality of pieces of decoded data respectively corresponding to the plurality of pieces of compressed image data are generated;
 a switcher configured to output the plurality of pieces of decoded data, by every predetermined amount, in association with an identification code of a corresponding portion of the plurality of pieces of compressed image data as process target data, the switcher being further configured to switch a destination decoder among the plurality of pieces of decoders every time when the predetermined amount of process target data is output;
 a converter configured to convert the predetermined amount of process target data to sub-image data constituting the uncompressed image data corresponding to the compressed image data by applying an inverse quantization process and an inverse frequency conversion process to the predetermined amount of process target data;
 a storage having a plurality of storage areas respectively corresponding to the plurality of pieces of compressed image data; and
 a controller,
 the controller includes a writing controller configured to store, per each piece of the compressed image data, the uncompressed image data composed of a group of pieces of sub-image data corresponding to the each of the compressed image data in the storage by writing each of the pieces of sub-image data converted by the converter in the storage area corresponding to the identification code associated with the each of the pieces of sub-image data.

2. The converting apparatus according to claim 1, wherein the predetermined amount is determined individually for each of respective decoders.

3. The converting apparatus according to claim 1,
 wherein the controller controls the switcher to switch a destination decoder such that the destination decoder is selected from among the plurality of decoders in accordance with a predetermined selection rule, and to transmit the decoded data generated by the plurality of decoders sequentially as the process target data.

4. The converting apparatus according to claim 3,
 wherein each of the decoders has a data storage configured to store the decoded data as waiting decoded data which is decoded data accumulated to be output, and
 wherein the controller controls the switcher to switch the destination decoder such that the decoders which do not have the waiting decoded data are not selected as the destination decoder.

5. The converting apparatus according to claim 3,
 wherein the controller controls the switcher to switch the destination decoder such that the destination decoder is cyclically switched in a predetermined order among the plurality of decoders.

6. The converting apparatus according to claim 5,
 wherein the plurality of pieces of compressed image data include a piece of compressed image data subject to print;
 wherein the predetermined amount of data defined for a specific decoder, which applies Huffman decoding to the compressed image data subject to print, among the plurality of decoders, corresponds to a data amount of the uncompressed image data corresponding to the compressed image data which can be written in the storage at a writing speed corresponding to an execution speed of the printing process;
 wherein the predetermined data amount of remaining decoders among the plurality of decoders is determined such that a remaining data amount calculated by subtracting the predetermined data amount defined to the specific decoder from a data amount which can be processed by the converter in a period during which the destination is cyclically switched among the plurality of decoders is distributed to the remaining decoders.

7. The converting apparatus according to claim 1,
 wherein each piece of the sub-image data is one or plurality of pieces of block data which are defined by sectioning the uncompressed image data into plurality of predetermined pixel blocks, and
 wherein the predetermined data amount is a data amount corresponding to one or plurality of pieces of the block data.

8. The converting apparatus according to claim 1,
 wherein the switcher comprising a storage updater configured to:
  store a designation value designating one of the plurality of pieces of decoders as the destination, and update the designation value in response to output of the process target data; and
  output the decoded data generated by the destination decoder which is the destination decoder designated by the designation value stored in the storage updater as the process target data.

9. The converting apparatus according to claim 1,
 wherein the controller controls the switcher to switch the destination decoders by not selecting the decoder, which has completed transmitting the decoded data to the converter, from among the plurality of converters as the destination decoder.

10. The converting apparatus according to claim 1,
 wherein, although the controller controls the switcher to switch the destination decoder every time when the predetermined amount of process data is output, when output of the decoded data corresponding to the destination decoder has completed before the predetermined amount of data has been output, the controller controls the switcher to switch the destination decoder when output of the decoded data corresponding to the destination decoder has completed.

* * * * *